United States Patent
Fukunaga et al.

(10) Patent No.: US 9,082,556 B2
(45) Date of Patent: Jul. 14, 2015

(54) MONOLITHIC CERAMIC CAPACITOR

(75) Inventors: Daiki Fukunaga, Nagaokakyo (JP);
Kenichi Okajima, Nagaokakyo (JP);
Yasuharu Yamashita, Nagaokakyo (JP);
Naoto Muranishi, Nagaokakyo (JP);
Hideaki Tanaka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 186 days.

(21) Appl. No.: 13/491,626

(22) Filed: Jun. 8, 2012

(65) Prior Publication Data

US 2012/0250217 A1  Oct. 4, 2012

Related U.S. Application Data

(63) Continuation of application No. PCT/JP2010/072218, filed on Dec. 10, 2010.

(30) Foreign Application Priority Data

Dec. 11, 2009  (JP) ................. 2009-281684

(51) Int. Cl.
*H01G 4/30* (2006.01)
*H01G 4/005* (2006.01)
*H01G 4/06* (2006.01)
*H01G 4/012* (2006.01)
*H01G 4/12* (2006.01)

(52) U.S. Cl.
CPC ............. *H01G 4/30* (2013.01); *H01G 4/012* (2013.01); *H01G 4/12* (2013.01)

(58) Field of Classification Search
CPC ....... H01G 4/30; H01G 4/1227; H01G 28/55; H01G 4/232
USPC ............. 361/303, 321.1, 321.2, 301.4
See application file for complete search history.

(56) References Cited

U.S. PATENT DOCUMENTS

| 6,014,309 A | 1/2000 | Ueno et al. |
| 2007/0251066 A1* | 11/2007 | Kim et al. ............... 29/25.02 |
| 2010/0085682 A1 | 4/2010 | Abe et al. |

FOREIGN PATENT DOCUMENTS

| JP | 59-222917 A | 12/1984 |
| JP | 60-124813 A | 7/1985 |

(Continued)

OTHER PUBLICATIONS

Official Communication issued in International Patent Application No. PCT/JP2010/072218, mailed on Mar. 15, 2011.

(Continued)

*Primary Examiner* — David M Sinclair
*Assistant Examiner* — Arun Ramaswamy
(74) *Attorney, Agent, or Firm* — Keating & Bennett, LLP

(57) ABSTRACT

A monolithic ceramic capacitor includes a ceramic sintered body including a plurality of stacked ceramic layers, and first and second inner electrodes alternately arranged inside the ceramic sintered body to oppose each other in a stacking direction of the ceramic layers with the ceramic layers interposed between the adjacent first and second inner electrodes. Among the ceramic layers, a number N of the ceramic layers disposed between the first inner electrodes and the second inner electrodes is at least 232. A proportion of volume occupied by the first and second inner electrodes in the ceramic sintered body is at least about 0.37. A size of each of side gap portions is about 40 μm or less.

2 Claims, 4 Drawing Sheets

(56) References Cited

FOREIGN PATENT DOCUMENTS

| | | | |
|---|---|---|---|
| JP | 61-15315 A | | 1/1986 |
| JP | 61-237413 A | | 10/1986 |
| JP | 61-248413 A | | 11/1986 |
| JP | 3-241802 A | | 10/1991 |
| JP | 3-241813 A | | 10/1991 |
| JP | 6-013259 A | | 1/1994 |
| JP | 6-349669 A | | 12/1994 |
| JP | 7-122455 A | | 5/1995 |
| JP | 9-153433 A | | 6/1997 |
| JP | 10-308322 A | | 11/1998 |
| JP | 10-312933 A | | 11/1998 |
| JP | 2003-318060 A | | 11/2003 |
| JP | 2004-152909 A | | 5/2004 |
| JP | 2004152909 A | * | 5/2004 |
| JP | 2004-356333 A | | 12/2004 |
| JP | 2005-259772 A | | 9/2005 |
| JP | 2005259772 A | * | 9/2005 |
| JP | 2010-092896 A | | 4/2010 |
| JP | 2010-093037 A | | 4/2010 |
| JP | 2010-093038 A | | 4/2010 |
| JP | 2012-094819 A | | 5/2012 |
| JP | 2012-094820 A | | 5/2012 |

OTHER PUBLICATIONS

Yamashita; "Monolithic Ceramic Electronic Component"; U.S. Appl. No. 13/491,625, filed Jun. 8, 2012.

Yamashita et al.; "Multilayer Ceramic Electronic Component", U.S. Appl. No. 13/491,624, filed Jun. 8, 2012.

Shiota; "Monolithic Ceramic Capacitor"; U.S. Appl. No. 13/491,627, filed Jun. 8, 2012.

* cited by examiner

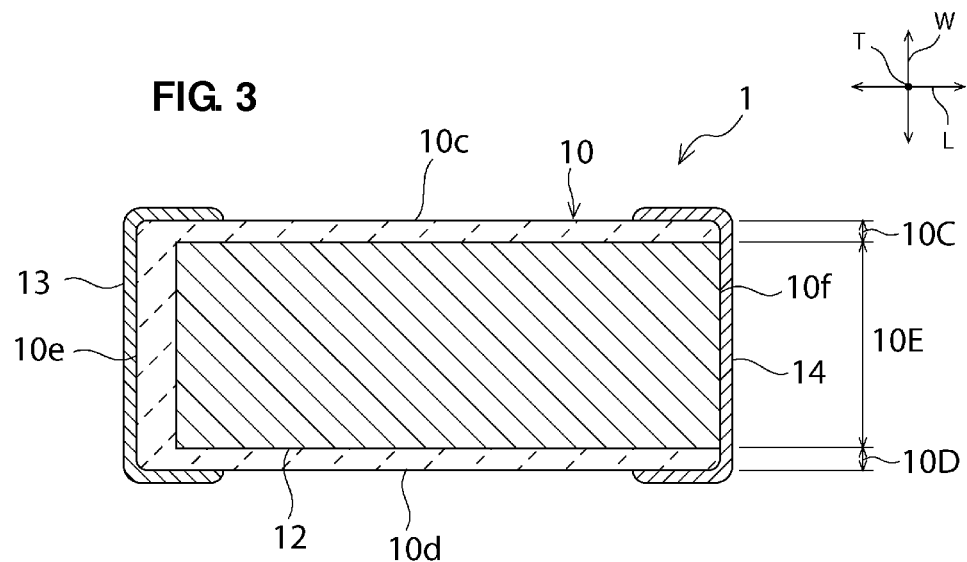
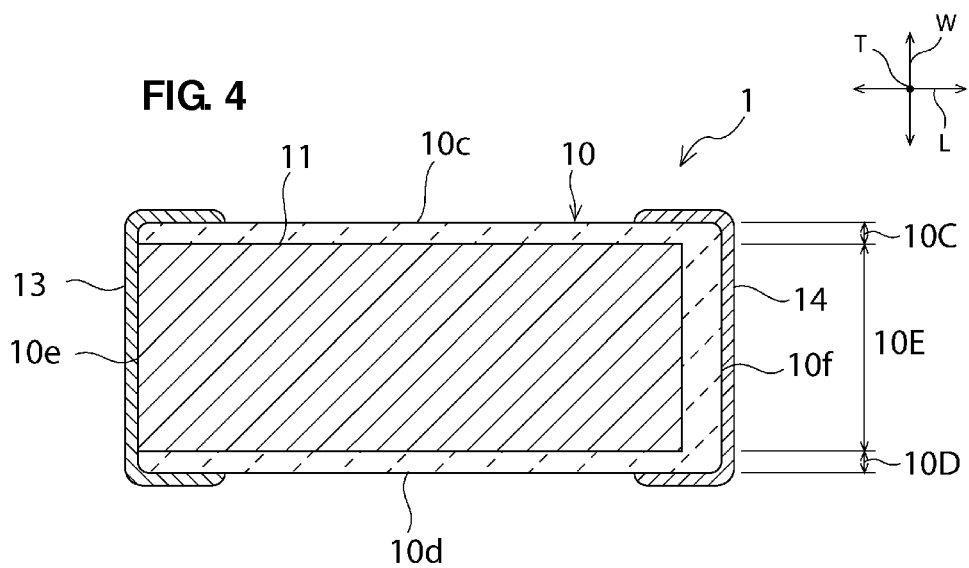

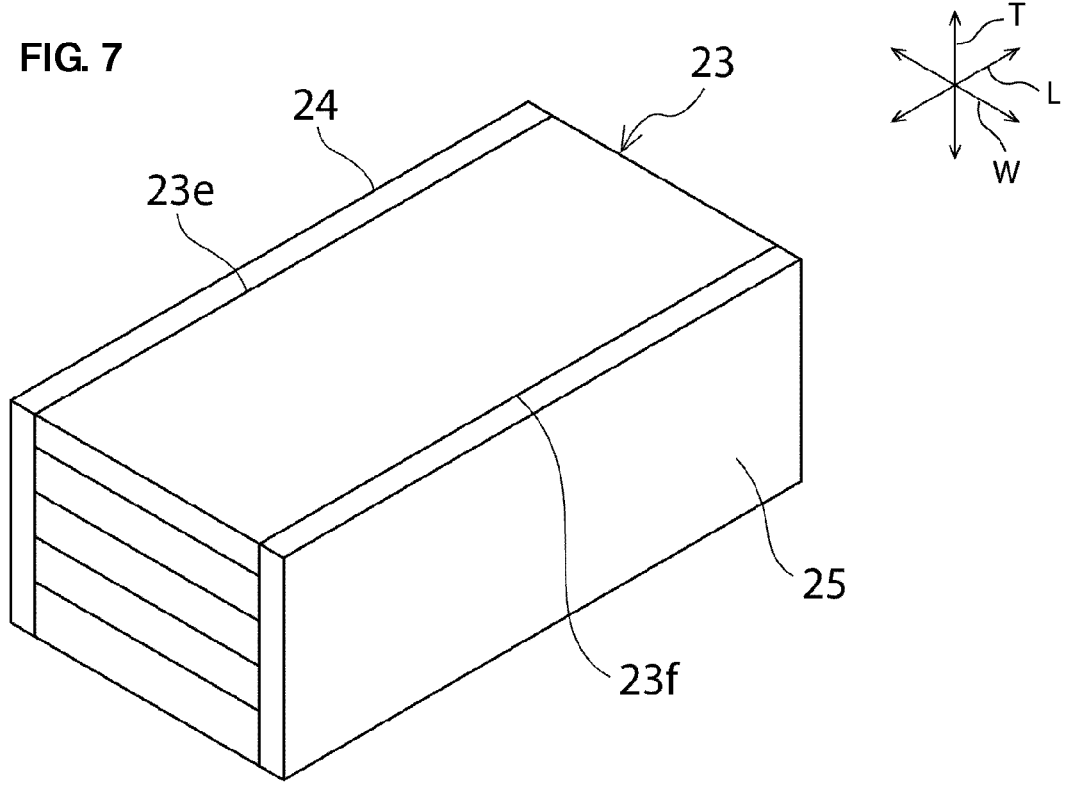

MONOLITHIC CERAMIC CAPACITOR

BACKGROUND OF THE INVENTION

1. Field of the Invention

The present invention relates to a monolithic ceramic capacitor. In particular, the present invention relates to a monolithic ceramic capacitor including a ceramic sintered body, and a plurality of first and second inner electrodes that are alternately arranged inside the ceramic sintered body so as to be opposed to each other with a ceramic layer interposed between the adjacent first and second inner electrodes.

2. Description of the Related Art

Previously, monolithic ceramic capacitors, for example, have been used in many electronic devices, such as cellular phones and notebook personal computers.

With a recent trend toward smaller sizes and higher performance of electronic devices in which monolithic ceramic capacitors are mounted, monolithic ceramic capacitors having smaller sizes and higher capacities have been developed. As large-capacity capacitors of 10 μF to 100 μF, for example, an aluminum electrolytic capacitor and a tantalum capacitor have been primarily used to date. However, the use of monolithic ceramic capacitors has also begun.

Generally, the electrostatic capacity of a monolithic ceramic capacitor is proportional to the relative dielectric constant of a dielectric layer, the area in which inner electrodes are opposed to each other, and the number of stacked inner electrodes and is inversely proportional to the thickness of the dielectric layer. In order to obtain a larger electrostatic capacity while maintaining predetermined dimensions, therefore, the number of stacked inner electrodes must be increased and the thickness of the dielectric layer must be reduced. However, when trying to satisfy those requirements, a problem arises in that structural defects, such as cracks and delamination, are more likely to occur during firing. In view of such problems, various ways to prevent the structural defects, such as cracks and delamination, during the firing by reducing thicknesses of ceramic green sheets and inner electrodes and stacking them in larger numbers, are proposed as described in Japanese Unexamined Patent Application Publication No. 2003-318060, for example.

However, the monolithic ceramic capacitor including ceramic layers, which are thinner and are stacked in a larger number, has a problem in that cracks are more likely to occur when thermal shocks is applied during, e.g., soldering.

SUMMARY OF THE INVENTION

To overcome the problems described above, preferred embodiments of the present invention provide a monolithic ceramic capacitor, which has a small size and a large capacity, and which is less susceptible to cracks caused by thermal shocks.

A monolithic ceramic capacitor according to a preferred embodiment of the present invention preferably includes a ceramic sintered body having a parallelepiped shape, and first and second inner electrodes. The ceramic sintered body includes a plurality of stacked ceramic layers. The ceramic sintered body includes first and second principal surfaces extending in a lengthwise direction and a widthwise direction perpendicular to the lengthwise direction, first and second lateral surfaces extending in a thickness direction perpendicular to both the lengthwise direction and the widthwise direction and in the lengthwise direction, and first and second end surfaces extending in the widthwise direction and the thickness direction. The first and second inner electrodes are alternately arranged inside the ceramic sintered body so as to be opposed to each other in a third direction with the ceramic layer interposed between the adjacent first and second inner electrodes. Among the ceramic layers, the number of the ceramic layers disposed between the first inner electrodes and the second inner electrodes is preferably at least 232, for example. The ceramic sintered body includes an inner layer portion in which the first and second inner electrodes are opposed to each other when viewed from the thickness direction, outer layer portions which are disposed on both sides of the inner layer portion in the thickness direction and in which the first and second inner electrodes are both not disposed, and side gap portions which are disposed on both sides of the inner layer portion in the widthwise direction and in which the first and second inner electrodes are both not disposed. A proportion of volume occupied by the first and second inner electrodes in the ceramic sintered body is preferably at least about 0.37, for example. A size of the side gap portions in the widthwise direction is preferably about 40 μm or less, for example.

In various preferred embodiments of the present invention, among the ceramic layers, the number N of the ceramic layers disposed between the first inner electrodes and the second inner electrodes is preferably at least 232, for example. Thus, the monolithic ceramic capacitor according to preferred embodiments of the present invention includes a large number of the stacked ceramic layers and exhibits higher performance while having a small size. Further, the proportion of volume occupied by the first and second inner electrodes in the ceramic sintered body is preferably at least about 0.37, for example. Still further, the size of the side gap portion in the widthwise direction is preferably about 40 μm or less, for example. As a result, the monolithic ceramic capacitor according to preferred embodiments of the present invention is less susceptible to cracks.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a schematic sectional view taken along a line III-III in FIG. 2.

FIG. 4 is a schematic sectional view taken along a line IV-IV in FIG. 2.

FIG. 7 is a schematic perspective view illustrating a step of forming ceramic layers on both lateral surfaces.

DETAILED DESCRIPTION OF THE PREFERRED EMBODIMENTS

A ceramic capacitor 1, illustrated in FIG. 1, will be described below an example of a preferred embodiment of the present invention. However, the present invention is not limited to the ceramic capacitor 1.

Figure 1:
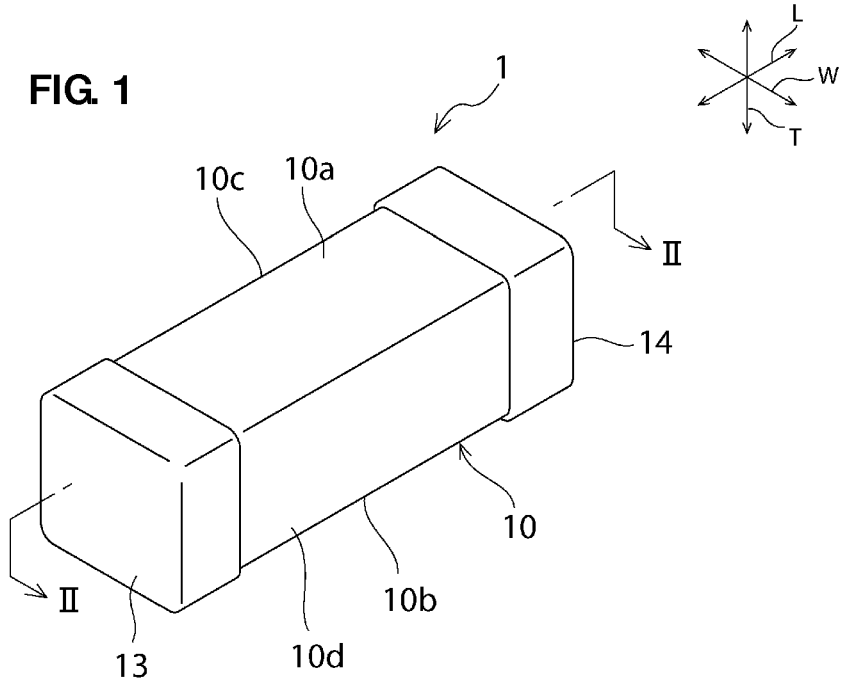
FIG. 1 is a schematic perspective view of a ceramic capacitor according to a preferred embodiment of the present invention.
Figure 2:
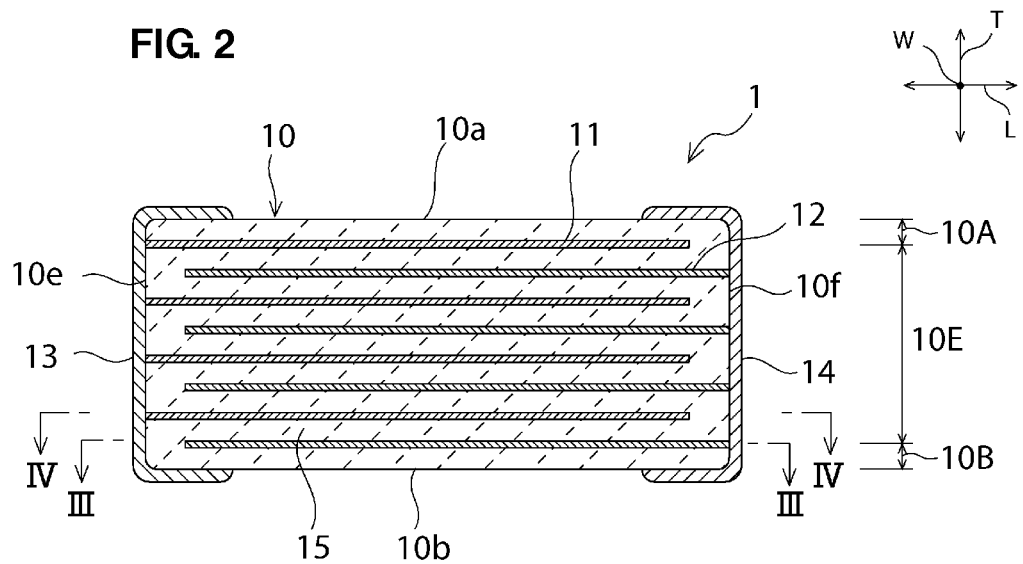
FIG. 2 is a schematic sectional view taken along a line II-II in FIG. 1.

FIG. 1 is a schematic perspective view of a ceramic capacitor according to a preferred embodiment of the present invention. FIG. 2 is a schematic sectional view taken along a line II-II in FIG. 1. FIG. 3 is a schematic sectional view taken along a line III-III in FIG. 2. FIG. 4 is a schematic sectional view taken along a line IV-IV in FIG. 2.

As illustrated in FIG. 1, the ceramic capacitor 1 according to the present preferred embodiment preferably includes a ceramic sintered body 10 having a parallelepiped shape. The ceramic sintered body 10 includes first and second principal surfaces 10a and 10b, first and second lateral surfaces 10c and 10d, and first and second end surfaces 10e and 10f. The first and second principal surfaces 10a and 10b extend in a lengthwise direction L and a widthwise direction W. The first and second lateral surfaces 10c and 10d extend in the lengthwise direction L and a thickness direction T. The first and second end surfaces 10e and 10f extend in the widthwise direction W and the thickness direction T.

It is to be noted that, in preferred embodiments of the present invention, the term "parallelepiped" includes a shape in which at least portions of corners and/or ridges are chamfered or rounded.

As illustrated in FIG. 2, the ceramic sintered body 10 includes a plurality of ceramic layers 15. In the present preferred embodiment, among the ceramic layers 15, a number N of the ceramic layers disposed between first inner electrodes 11 and second inner electrodes 12 is preferably at least 232, for example.

The ceramic layers 15 are each preferably made of a ceramic material. In the present preferred embodiment, the ceramic material preferably includes, in addition to ceramic, firing aids, such as Si and glass components, for example. Specific examples of the glass components, as the firing aids, include a silicate glass, a borate glass, a borosilicate glass, and a phosphate glass, which include alkali metal components and alkaline earth metal components.

A specific example of the ceramic primarily included in the ceramic material is a dielectric ceramic. Specific examples of the dielectric ceramic include, e.g., $BaTiO_3$, $CaTiO_3$, $SrTiO_3$, and $CaZrO_3$. Auxiliary components, e.g., a Mn compound, a Fe compound, a Mg compound, a Co compound, a Ni compound, and a rare-earth compound, may be added to the dielectric ceramic, as appropriate.

As illustrated in FIGS. 2 to 4, a plurality of first and second inner electrodes 11 and 12 are disposed inside the ceramic sintered body 10. The plurality of first and second inner electrodes 11 and 12 are alternately arranged so as to be opposed to each other in the thickness direction T with the ceramic layer 15 interposed between the adjacent first and second inner electrodes 11 and 12. The first and second inner electrodes 11 and 12 are each disposed parallel or substantially parallel to the first and second principal surfaces 10a and 10b. Each of the first and second inner electrodes 11 and 12 preferably has a rectangular or substantially rectangular shape in plan view.

The first inner electrodes 11 are exposed to the first end surface 10e, but they are not exposed to the second end surface 10f, the first and second lateral surfaces 10c and 10d, and the first and second principal surfaces 10a and 10b. The second inner electrodes 12 are exposed to the second end surface 10f, but they are not exposed to the first end surface 10e, the first and second lateral surfaces 10c and 10d, and the first and second principal surfaces 10a and 10b.

A first outer electrode 13 is disposed on the first end surface 10e. The first outer electrode 13 is connected to the first inner electrodes 11. A second outer electrode 14 is disposed on the second end surface 10f. The second outer electrode 14 is connected to the second inner electrodes 12.

Materials of the first and second inner electrodes 11 and 12 and the first and second outer electrodes 13 and 14 are not limited to particular materials as long as the materials are electrically conductive. The first and second inner electrodes 11 and 12 and the first and second outer electrodes 13 and 14 can preferably be made of, e.g., a metal such as Ag, Au, Pt, Pd, Ni, Cr or Cu, or an alloy containing one or more of those metals. Further, the first and second inner electrodes 11 and 12 and the first and second outer electrodes 13 and 14 may preferably be each formed as a laminate including a plurality of conductive films.

As illustrated in FIGS. 2 to 4, the ceramic sintered body 10 preferably includes first and second outer layer portions 10A and 10B, first and second side gap portions 10C and 10D, and an inner layer portion 10E.

The first and second outer layer portions 10A and 10B are portions that are positioned outside a portion (i.e., the inner layer portion 10E) in which the first and second inner electrodes are disposed, when viewed in a direction (=thickness direction T) in which the first and second inner electrodes are stacked. More specifically, in the present preferred embodiment, the first and second outer layer portions 10A and 10B are disposed respectively at opposite end portions of the ceramic sintered body 10 in the thickness direction T.

The first and second side gap portions 10C and 10D are portions in which the first and second inner electrodes 11 and 12 are both not disposed, when viewed from a stacking direction (=thickness direction T) in which the first and second inner electrodes 11 and 12 are stacked. More specifically, in the present preferred embodiment, the first and second side gap portions 10C and 10D are disposed respectively at opposite end portions of the ceramic sintered body 10 in the widthwise direction W.

The inner layer portion 10E is a portion of the ceramic sintered body 10 except for the first and second outer layer portions 10A and 10B and the first and second side gap portions 10C and 10D. More specifically, in the present preferred embodiment, the inner layer portion 10E is positioned in a region of the ceramic sintered body 10 except for the opposite end portions in the widthwise direction W and the opposite end portions in the thickness direction T. Thus, the inner layer portion 10E includes a portion in which the first and second inner electrodes 11 and 12 are opposed to each other in the thickness direction T, and a portion where only either the first or second inner electrodes 11 or 12 are disposed when viewed from the thickness direction T.

The size of each of the side gap portions 10C and 10D in the widthwise direction W is preferably about 40 μm or less, for example.

In the monolithic ceramic capacitor 1 according to the present preferred embodiment, the number N of the ceramic layers 15 stacked between the first and second inner electrodes 11 and 12 is preferably at least 232, for example. In this type of monolithic ceramic capacitor, cracks are likely to occur due to thermal shocks being applied during, e.g., soldering.

However, in the present preferred embodiment, a proportion of volume occupied by the first and second inner electrodes 11 and 12 in the ceramic sintered body 10 is preferably set to be at least about 0.37, for example. Therefore, a proportion of metal components (including a metal and an alloy) occupied in the ceramic sintered body 10 is relatively high. Accordingly, high mechanical strength is achieved. Thus, the present preferred embodiment achieves not only a small size and high performance, but also high mechanical strength, such as deflection strength and flexural strength.

From the viewpoint of increasing the proportion of volume occupied by the first and second inner electrodes 11 and 12 in the ceramic sintered body 10, it is preferable that respective sizes of the side gap portions 10C and 10D and the outer layer portions 10A and 10B in which the first and second inner electrodes 11 and 12 are not disposed are reduced.

More specifically, the size of each of the side gap portions 10C and 10D in the widthwise direction is preferably about 40 μm or less, for example. In the monolithic ceramic capacitor 1 including the side gap portions 10C and 10D, cracks are unlikely to occur. Though not yet definite, the reason is presumably as follow. When thermal shocks are applied to the monolithic ceramic capacitor 1, the inner layer portion 10E in which the proportion of the inner electrodes 11 and 12 is relatively high is caused to thermally expand in the thickness direction T, while the side gap portions 10C and 10D positioned on both sides of the inner layer portion 10E flexibly follow the thermal expansions of the inner layer portion 10E without resisting to the thermal expansions. As a result, a difference in distortion between the inner layer portion 10E and the side gap portions 10C, 10D is reduced.

One example of a method of manufacturing the monolithic ceramic capacitor 1 according to a preferred embodiment will be described below with reference to FIGS. 5 to 7.

Figure 5:
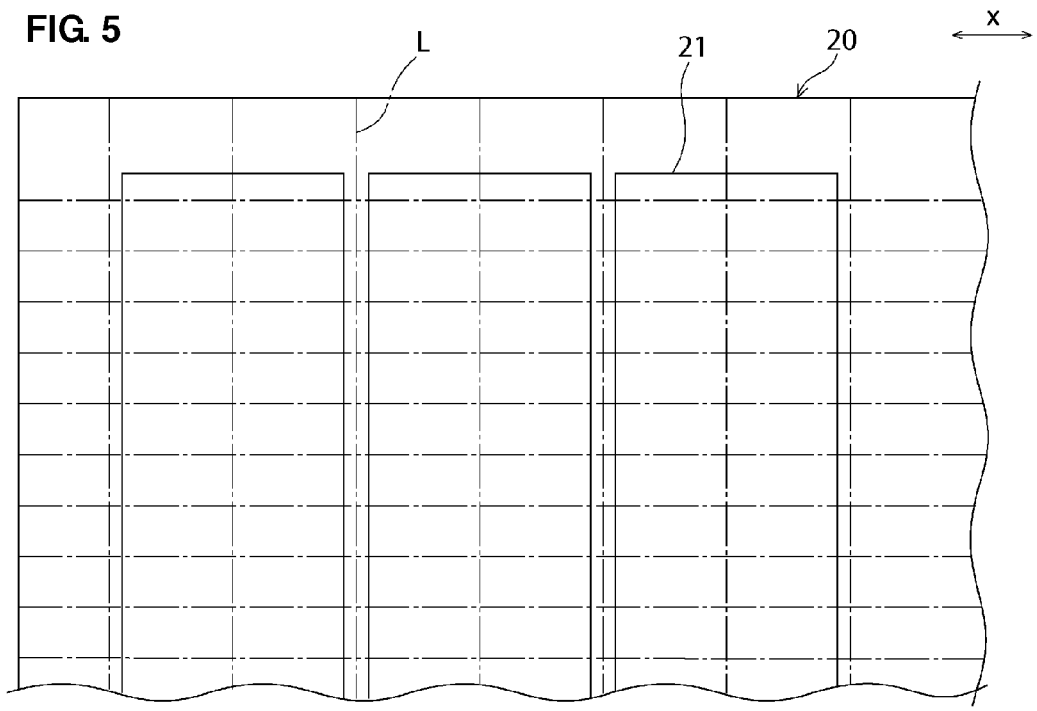
FIG. 5 is a schematic plan view of a ceramic green sheet on which conductor patterns are printed.

First, a ceramic green sheet 20, illustrated in FIG. 5, is formed. A method of forming the ceramic green sheet 20 is not limited to any particular method.

Next, a plurality of conductor patterns 21 in a linear configuration is formed on the ceramic green sheet 20. The conductor patterns 21 are arranged to form the first and second inner electrodes 11 and 12. A method of forming the conductor patterns 21 is not limited to any particular method. The conductor patterns 21 can be formed by, e.g., a screen printing method, an ink jet method, or a gravure printing method.

Next, a plurality of ceramic green sheets 20, each not including the conductor patterns 21 formed thereon, are stacked on one another. Then, a plurality of ceramic green sheets 20, each including the conductor patterns 21 formed thereon, are stacked such that the ceramic green sheets 20 are alternately shifted to one side and to the other side in an x-direction. Further, a plurality of ceramic green sheets 20, each not including the conductor patterns 21 formed thereon, are stacked successively, thus completing a laminate. Here, the ceramic green sheets 20, each not including the conductor patterns 21 formed thereon, which are stacked first and last, form the first and second outer layer portions 10A and 10B.

Next, the obtained laminate is pressed in the stacking direction by, e.g., isostatic hydrostatic pressing.

Figure 6:
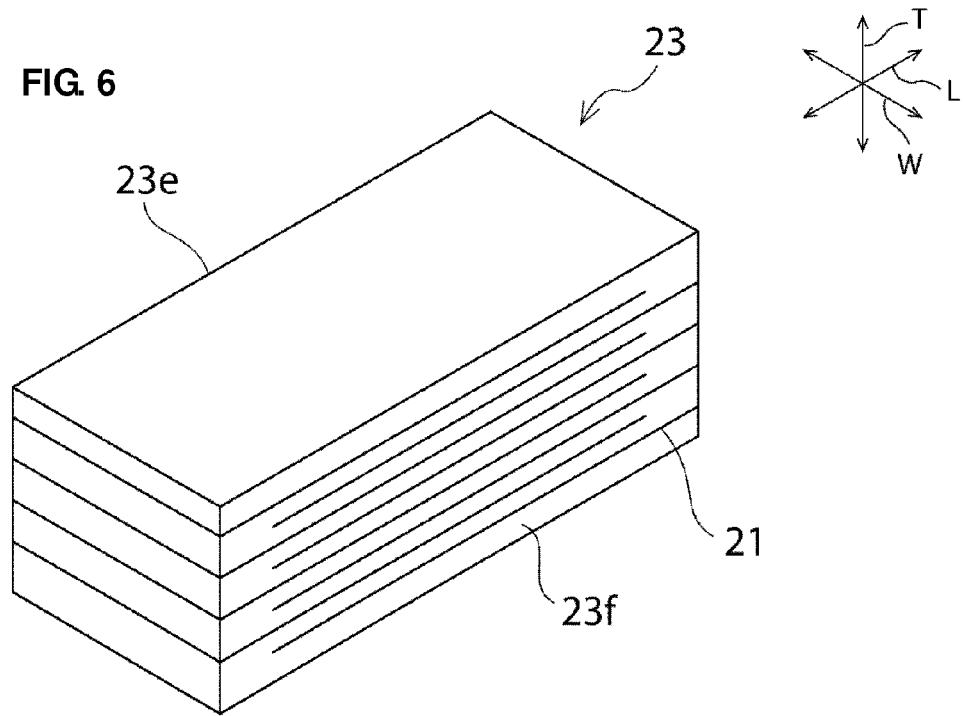
FIG. 6 is a schematic perspective view of a ceramic member.

Next, the laminate after the pressing is cut along imaginary cut lines L illustrated in FIG. 5, thereby forming a plurality of parallelepiped ceramic members 23, one of which is illustrated in FIG. 6. The laminate can be cut by dicing or push cutting, for example. Alternatively, the laminate may be cut by using a laser, for example.

Next, as illustrated in FIG. 7, ceramic layers 24 and 25 are arranged on end surfaces 23e and 23f of the ceramic member 23, respectively, so as to cover the end surfaces 23e and 23f. The ceramic layers 24 and 25 define the first and second side gap portions 10C and 10D, respectively.

A method of forming the ceramic layers 24 and 25 is not limited to any particular method. The ceramic layers 24 and 25 can be formed by, e.g., a printing method such as screen printing, an ink jet method, a coating method such as gravure coating, or an atomizing method.

Next, the ceramic member 23 including the ceramic layers 24 and 25 formed thereon is sintered. The ceramic sintered body 10 is thereby completed.

Finally, by forming the first and second outer electrodes 13 and 14, the monolithic ceramic capacitor 1, illustrated in FIGS. 1 to 4, is completed. A method of forming the first and second outer electrodes 13 and 14 is not limited to any particular method. The first and second outer electrodes 13 and 14 may preferably be formed, for example, by coating a conductive paste and then baking it. In such a case, the conductive paste may be coated before firing the ceramic member 23, and the first and second outer electrodes 13 and 14 may be formed at the same time as the firing. As another example, the first and second outer electrodes 13 and 14 may preferably be formed by, e.g., plating.

The present preferred embodiment has been described in connection with an example in which the first and second inner electrodes 11 and 12 are parallel or substantially parallel to the first and second principal surfaces 10a and 10b, and the first inner electrodes 11 are led out to the first end surface 10e, while the second inner electrodes 12 are led out to the second end surface 10f. However, in preferred embodiments of the present invention, the arrangement of the first and second inner electrodes is not limited to any particular arrangement as long as gap layers are formed in the ceramic sintered body.

For example, the first and second inner electrodes may be formed parallel or substantially parallel to the first and second lateral surfaces or to the first and second end surfaces.

EXPERIMENTAL EXAMPLES

The ceramic capacitor 1 according to the above-described preferred embodiment was fabricated using the same materials under the conditions indicated in Tables 1 to 3, below, in 300 samples for each set of conditions.

Among the various dimensions indicated in Tables 1 to 3, the length, the width, and the thickness of the ceramic sintered body were measured by an optical microscope (MEASURESCOPE MM-10 made by Nikon Corporation) at a magnification of 50 and accuracy of ±0.01 mm. The thickness of the ceramic layer and the thickness of the inner electrode were measured by a scanning electron microscope (JSM-5800 made by JOEL Ltd.) at an acceleration voltage of 20 kV, a magnification of 15000, and accuracy of ±0.01 μm. The other dimensions were measured by an optical microscope at a magnification of 500 and accuracy of ±0.001 mm.

The distance from the end of the inner electrode to the outer electrode was measured at a central portion of the capacitor in the widthwise direction.

The size of the side gap portion was measured in a central portion in the lengthwise direction.

The thickness of the outer layer portion, the thickness of the ceramic layer, and the thickness of the inner electrode were measured at a central portion in plan view.

The coverage of the inner electrode was measured as follows. The capacitor was ground to such an extent so as to leave only a portion of the inner layer portion in which the first and second inner electrodes are opposed to each other in the thickness direction T. The left portion was further ground, thus exposing the inner electrode. Then, the portion was dipped in an aqueous solution of potassium hydroxide, whereby the inner electrode was peeled off next to a central ceramic layer. Then, an image of one point in a central region of the peeled inner electrode was taken by an optical microscope and a proportion of an area in which the electrode was formed was determined through a binarizing process, thereby obtaining the coverage.

The volume occupied by the inner electrodes in the ceramic sintered body was calculated on the basis of (length of the ceramic sintered body−length of an end gap portion)×(width of the ceramic sintered body−width of the side gap portion×2)×thickness of the inner electrode×(number of the stacked ceramic layers+1)×coverage of the inner electrode. Here, the end gap portion denotes a portion of the inner layer portion in which the first and second inner electrodes are not opposed to each other in the thickness direction. The length of the end gap portion denotes the size of the end gap portion measured in the lengthwise direction. The width of the side gap portion denotes the size of the side gap portion in the widthwise direction.

The volume of the ceramic sintered body was calculated on the basis of length of the ceramic sintered body×(with of the ceramic sintered body−width of the side gap portion×2)×number of the stacked ceramic layers+length of the ceramic sintered body×width of the ceramic sintered body×thickness of the outer layer portion×2+width of the side gap portion×(thickness of the ceramic sintered body−thickness of the outer layer portion×2)×2.

Next, thermal shock tests were conducted on the fabricated samples as follows. An incidence rate of crack failures was determined by observing the samples with a microscope when the samples were dipped in a solder bath under later-described conditions and were subjected to thermal shocks. The observed results are indicated in Tables 1 to 3.

TABLE 1

| | Sample | | | | |
|---|---|---|---|---|---|
| | 1 | 2 | 3 | 4 | 5 |
| Length of ceramic sintered body (L) (mm) | 0.64 | 0.64 | 0.64 | 0.64 | 0.64 |
| Width of ceramic sintered body (W) (mm) | 0.32 | 0.32 | 0.32 | 0.32 | 0.32 |
| Thickness of ceramic sintered body (T) (mm) | 0.32 | 0.32 | 0.32 | 0.32 | 0.32 |
| Thickness of ceramic layer (μm) | 0.55 | 0.55 | 0.55 | 0.55 | 0.55 |
| Thickness of inner electrode (μm) | 0.67 | 0.6 | 0.57 | 0.57 | 0.46 |
| Coverage of inner electrode | 0.9 | 0.85 | 0.78 | 0.78 | 0.7 |
| Length of end gap portion (μm) | 40 | 40 | 40 | 40 | 40 |
| Length of side gap portion (μm) | 60 | 50 | 40 | 30 | 20 |
| Thickness of outer layer portion (μm) | 30 | 30 | 30 | 30 | 30 |
| Number of stacked ceramic layers | 213 | 226 | 232 | 232 | 257 |
| Proportion occupied by inner electrodes | 0.57 | 0.51 | 0.47 | 0.48 | 0.37 |
| Incidence rate of cracks | 3/300 | 2/300 | 0/300 | 0/300 | 0/300 |

TABLE 2

| | Sample | | | | |
|---|---|---|---|---|---|
| | 6 | 7 | 8 | 9 | 10 |
| Length of ceramic sintered body (L) (mm) | 1.1 | 1.1 | 1.1 | 1.1 | 1.1 |
| Width of ceramic sintered body (W) (mm) | 0.63 | 0.63 | 0.63 | 0.63 | 0.63 |
| Thickness of ceramic sintered body (T) (mm) | 0.63 | 0.63 | 0.63 | 0.63 | 0.63 |
| Thickness of ceramic layer (μm) | 0.55 | 0.55 | 0.55 | 0.55 | 0.55 |
| Thickness of inner electrode (μm) | 0.67 | 0.6 | 0.57 | 0.57 | 0.46 |
| Coverage of inner electrode | 0.9 | 0.85 | 0.78 | 0.78 | 0.7 |
| Length of end gap portion (μm) | 40 | 40 | 40 | 40 | 40 |
| Length of side gap portion (μm) | 60 | 50 | 40 | 30 | 20 |
| Thickness of outer layer portion (μm) | 30 | 30 | 30 | 30 | 30 |
| Number of stacked ceramic layers | 467 | 496 | 509 | 509 | 564 |
| Proportion occupied by inner electrodes | 0.82 | 0.71 | 0.63 | 0.63 | 0.47 |
| Incidence rate of cracks | 3/300 | 2/300 | 0/300 | 0/300 | 0/300 |

TABLE 3

| | Sample | | | | |
|---|---|---|---|---|---|
| | 11 | 12 | 13 | 14 | 15 |
| Length of ceramic sintered body (L) (mm) | 1.7 | 1.7 | 1.7 | 1.7 | 1.7 |
| Width of ceramic sintered body (W) (mm) | 0.9 | 0.9 | 0.9 | 0.9 | 0.9 |
| Thickness of ceramic sintered body (T) (mm) | 0.9 | 0.9 | 0.9 | 0.9 | 0.9 |
| Thickness of ceramic layer (μm) | 0.55 | 0.55 | 0.55 | 0.55 | 0.55 |
| Thickness of inner electrode (μm) | 0.67 | 0.6 | 0.57 | 0.57 | 0.46 |
| Coverage of inner electrode | 0.85 | 0.78 | 0.78 | 0.7 | 0.62 |
| Length of end gap portion (μm) | 40 | 40 | 40 | 40 | 40 |
| Length of side gap portion (μm) | 60 | 50 | 40 | 30 | 20 |
| Thickness of outer layer portion (μm) | 30 | 30 | 30 | 30 | 30 |
| Number of stacked ceramic layers | 689 | 730 | 750 | 750 | 832 |
| Proportion occupied by inner electrodes | 0.86 | 0.71 | 0.68 | 0.61 | 0.45 |
| Incidence rate of cracks | 5/300 | 2/300 | 0/300 | 0/300 | 0/300 |

As seen from the results indicated in Tables 1 to 3, when the proportion of volume occupied by the first and second inner electrodes 11 and 12 in the ceramic sintered body 10 is at least about 0.37 and the size of each of the side gap portions 10C and 10D is about 40 μm or less, cracks are not likely to occur and thermal shock resistance is high.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic capacitor comprising:
    a ceramic body including a plurality of stacked ceramic layers, first and second principal surfaces extending in a lengthwise direction and a widthwise direction perpendicular to the lengthwise direction, first and second lateral surfaces extending in a thickness direction perpendicular to both the lengthwise direction and the widthwise direction and in the lengthwise direction, and first and second end surfaces extending in the widthwise direction and the thickness direction;
    first and second inner electrodes alternately arranged inside the ceramic body so as to be opposed to each other in the thickness direction with respective ceramic layers of the plurality of ceramic layers interposed between adjacent ones of the first and second inner electrodes; and
    additional ceramic layers disposed on end surfaces of the stacked ceramic layers in the widthwise direction so as to cover the end surfaces of the stacked ceramic layers; wherein
    among the plurality of ceramic layers, a number N of the respective ceramic layers disposed between the first inner electrodes and the second inner electrodes is at least 232;
    the ceramic body further includes:
        an inner layer portion in which the first and second inner electrodes are opposed to each other when viewed from the thickness direction;
        outer layer portions which are disposed on both sides of the inner layer portion in the thickness direction and in which neither of the first and second inner electrodes are disposed; and
        side gap portions which are disposed on both sides of the inner layer portion in the widthwise direction and in which neither of the first and second inner electrodes are disposed; and
    the side gap portions are defined by the additional ceramic layers;
    a proportion of volume occupied by the first and second inner electrodes in the ceramic body is at least about 0.37;
    a size of each of the side gap portions in the widthwise direction is about 40 μm or less; and
    a length of the ceramic body in the lengthwise direction is 1.1 mm, a width of the ceramic body in the widthwise direction is 0.63 mm, and a thickness of the ceramic body in the thickness direction is 0.63 mm.

2. The monolithic ceramic capacitor according to claim 1, wherein the additional ceramic layers extend along and cover the first and second lateral surfaces of the ceramic body.

* * * * *